US009875485B2

(12) United States Patent
Torrance et al.

(10) Patent No.: US 9,875,485 B2
(45) Date of Patent: *Jan. 23, 2018

(54) FIRST PARTY COOKIE ATTRIBUTION (71) Applicant: Rocket Fuel Inc., Redwood City, CA (US)

(72) Inventors: Mark Charles Torrance, San Jose, CA (US); Michael Jared Benisch, Redwood City, CA (US); Rajaraman Periasamy, Santa Clara, CA (US)

(73) Assignee: Rocket Fuel Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,398

(22) Filed: Jun. 26, 2017

(65) Prior Publication Data
US 2017/0293935 A1 Oct. 12, 2017

Related U.S. Application Data (63) Continuation of application No. 14/054,644, filed on Oct. 15, 2013, now Pat. No. 9,691,080.

(51) Int. Cl.
G06Q 30/00 (2012.01)
G06Q 30/02 (2012.01)
H04L 29/08 (2006.01)

(52) U.S. Cl.
CPC ..... *G06Q 30/0246* (2013.01); *G06Q 30/0255* (2013.01); *H04L 29/08621* (2013.01)

(58) Field of Classification Search
CPC ............ G06C 30/0246; G06C 30/0255; H04L 29/08621
USPC ...................................... 705/14.45
See application file for complete search history.

(56) References Cited

U.S. PATENT DOCUMENTS

| 8,539,101 | B2 | 9/2013 | Christianson et al. |
| 8,818,845 | B2 | 8/2014 | Mosites et al. |
| 8,881,250 | B2 | 11/2014 | Yefimov et al. |
| 2006/0212350 | A1 | 9/2006 | Ellis et al. |

(Continued)

OTHER PUBLICATIONS

"Find the URID for JavaScript—Conversion Tracking—Millenial Media Developers," MillenialMedia, Last Modified Mar. 17, 2015, 3 pages, [Online] [Retrieved on May 5, 2015] Retrieved from the Internet<URL:http://docs.millennialmedia.com/conversion-tracking/S2S/u- rid-for-javascript.html>.

(Continued)

*Primary Examiner* — David Stoltenberg
*Assistant Examiner* — Michael Ezewoko
(74) *Attorney, Agent, or Firm* — Fenwick & West LLP (57) ABSTRACT A third party company (also referred to as an ad server) provides an advertiser with computer code to place on the advertiser's web pages. The web page's code is configured to provide the ad server read and write access to an advertiser's first party cookie on a user's web browser. A user interacts with an ad on a mobile application or third party web page. Based on the user's interaction with the ad a URL containing a web address and ad instance information are sent to the user's web browser. The user's landing page associated with the URL contains code for retrieving the ad instance information and storing it in a first party cookie. When the user navigates to a purchasing page and purchases a product, the code contained in the purchasing page retrieves the ad instance information from the first party cookie and sends it to the ad server.

20 Claims, 8 Drawing Sheets (56) References Cited

U.S. PATENT DOCUMENTS

| | | |
|---|---|---|
| 2007/0050245 A1 | 3/2007 | Humphries et al. |
| 2011/0125593 A1 | 5/2011 | Wright et al. |
| 2013/0054366 A1 | 2/2013 | Roundtree et al. |
| 2014/0136606 A1 | 5/2014 | Roundtree |
| 2014/0244387 A1 | 8/2014 | Patton et al. |

OTHER PUBLICATIONS

United States Office Action, U.S. Appl. No. 14/054,644, dated May 5, 2016, 33 pages.
United States Office Action, U.S. Appl. No. 14/054,644, dated Sep. 28, 2015, 40 pages.

FIRST PARTY COOKIE ATTRIBUTION

CROSS REFERENCE TO RELATED APPLICATIONS

This application is a continuation of co-pending U.S. application Ser. No. 14/054,644 filed Oct. 15, 2013, which is incorporated by reference in its entirety.

BACKGROUND

1. Field of the Invention

This invention pertains in general to monitoring a user's interaction with an ad and storing information in a web browser's cookie during a web-browsing session.

2. Description of the Related Art

Online advertising has grown significantly in recent years. Web pages often include space for informational content desired by the web page's visitors (referred to as users, who use the information presented on the web page), as well as space for advertising (ad) content. The advertising space on a web page is generally referred to as ad inventory. The publisher of the web page then offers its ad inventory for sale, directly or indirectly, to advertisers. Advertisers purchase advertising space to place individual instances of ad content, generally referred to as impressions. Impressions are presented to the user with the hope of inducing the user to perform some desired act including, for example, clicking on an impression, visiting a specific web page, signing up for online services or news from a particular web page, or purchasing merchandise from yet another web page.

The online advertising industry includes many different types of advertisers that represent companies producing a wide variety of goods and services. As the internet has grown rapidly in recent years, concordantly the supply for ad inventory has also dramatically increased. However, given the wide variety of goods and services to be advertised, not all web pages have ad inventory that is valuable to a given advertiser. Thus, advertisers, often in partnership with third parties such as ad servers, try to identify ad inventory that is valuable to their customers. Ad servers help advertisers target particular web pages and audiences of users, instead of indiscriminately placing ads in front of a large number of users. To do this ad servers collect statistics regarding user traffic on web pages to make better advertising inventory purchase decisions. These statistics include web pages visited by users and the actions taken by those users on the visited web pages. The goal of such targeted advertising is to increase the likelihood that the users the advertiser advertises to actually convert.

To assist in advertising targeting, web pages may include embedded pixel tags that collect statistics regarding user visits. Typically, a pixel tag is a code snippet placed in the web page that is delivered to the user's web browser. The code snippet may, for example be written in HTML, XML, JavaScript™, or any other programming language. When the browser processes the web page, the code snippet is executed (referred to herein as "firing the pixel tag") causing the browser to transmit a message to a server identified in the code snippet. The message may include information regarding the internet protocol (IP) address of the computing device that executes the browser's rendition of the web page, the browser type, and a timestamp. Upon receiving the message, the server can store and aggregate this information to make advertising targeting decisions, and associate the user's identity with the stored information.

SUMMARY

A third party company (also referred to as an ad server) provides an advertiser with computer code to place on its web site, allowing the ad server and/or advertiser to log and analyze their user's interactions with individual ad instances displayed via a mobile application or a protected web browser as well as their subsequent web browsing activities.

The user may interact with an advertiser's ad instance in a mobile application or via a protected web browser. The ad instance includes unique identifying information generated by the advertiser. Once the user interacts with the ad instance, that unique ad instance information is sent to the user's web browser as part of a uniform resource locator (URL) for a web page associated with the advertiser. A landing page associated with the URL is launched by the web browser. Computer code provided by the ad server to the advertiser is run on the advertiser's web page in a first party context. This code retrieves the ad instance information from the URL and stores it in the advertiser's first party cookie. When the user later navigates to one of the advertiser's purchasing pages to purchase a product (e.g., a product associated with the advertisement), computer code provided by the ad server and included as part of the purchasing page retrieves the ad instance information from the advertiser's first party cookie and sends the ad instance information along with the purchase information to the ad server. Thus the ad server is able to log the particular ad instance that led the user to purchase a product. This ad instance to purchase information may be later analyzed to assist in future ad targeting.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Computing Environment Overview

Figure 1:
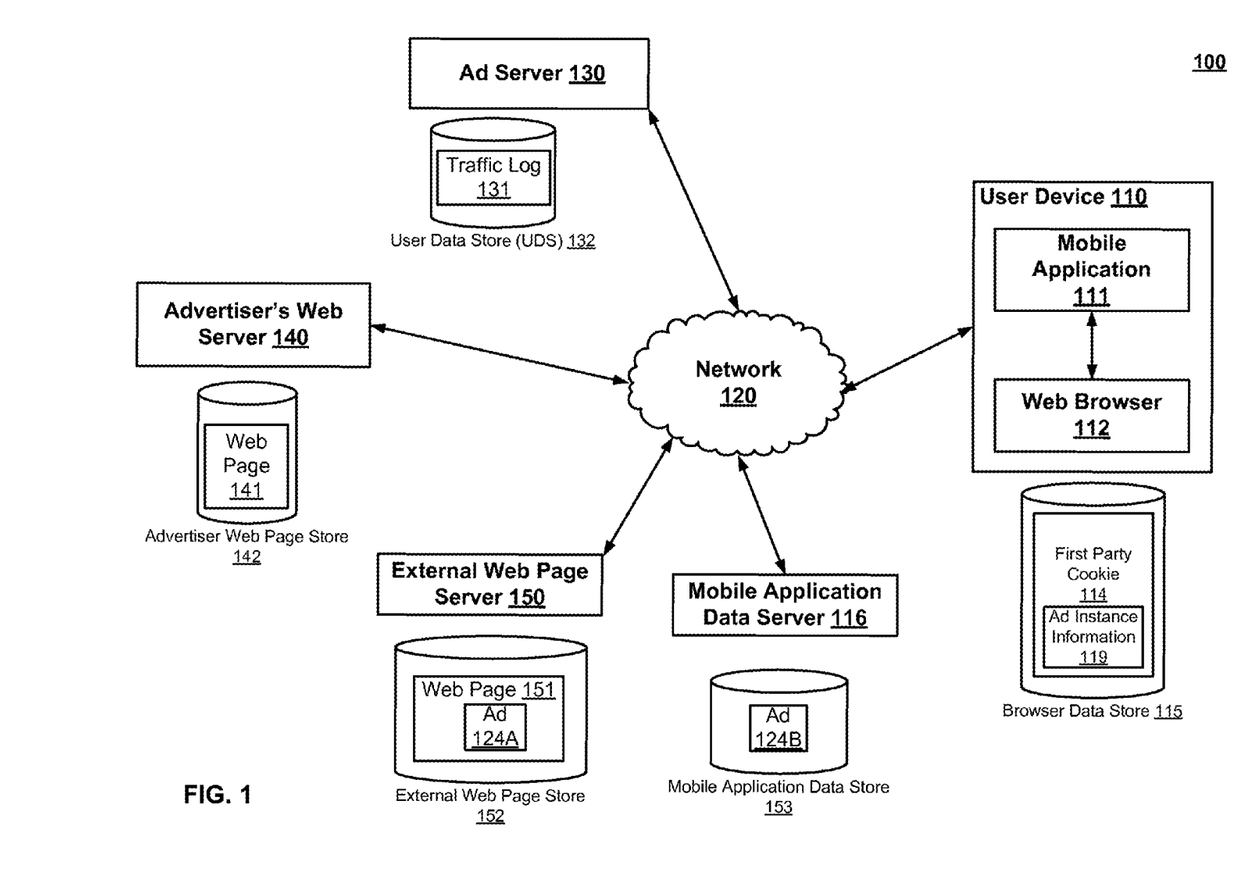
FIG. 1 illustrates a computing environment configured for delivering ad content to web browsers and mobile applications, according to one embodiment.

FIG. 1 illustrates a computing environment 100 configured for delivering web pages including advertising (ad) content to web browsers and mobile applications, according to one embodiment. The computing environment 100 includes a number of different computing systems including a user's computer 110, an ad server 130, an advertiser's web server 140 also referred to as a seller's web server 140, a external web page server 150, and a mobile application data server 116, all communicatively coupled through a communications network 120 (e.g., the internet). For example, the computing systems may be programmed to communicate with each other using a networking protocol such as transmission control protocol/internet protocol (TCP/IP). Although only one of each type of computing system is shown, in practice many of each type of entity exist on the internet, and the various instances of each type of computing systems interact with each other on a frequent basis.

A user uses a computer 110 (e.g., a smart phone, tablet computer, laptop computer, personal computer, etc.) having a web browser (or user agent) software application 112 to access web pages provided by web servers, such as the advertiser's web server 140 or other external web page servers 150. Examples of web browsers 112 include Firefox™, Chrome™, Safari™, and Internet Explorer™. For sake of clarity, reference to a user 110 is a reference to the user's computer 110, as a mechanism of abstracting away from the actual human actor controlling the computer 110.

A user may interact with a mobile application 111 (e.g., a game, an organization tool; a magazine reader, etc.) also operating on a user device 110. Ad instances may be displayed to the user as part of the mobile application 111. Upon interacting with the ad instance, the user may be directed to web page, such as the advertiser's web page 141, via the web browser 112.

The user's 110 web traffic, including ad instance interactions, ad instance information 119, web page visits, and actions on those visited web pages, will be locally stored in cookies 114 maintained in a browser data store 115. Cookies 114 may also store data regarding the type and version of the browser used, user IDs and/or a user's 110 IP address. Generally, cookies are browser 112 specific, such that each browser 112 will have its own set of stored cookies.

Individual cookies 114 are created, updated, and stored by the browser 112 at the behest of individual web servers such as the advertisers' web servers 140 and other external web page servers 150. At a minimum a cookie comprises two parameters, namely the name of the cookie and its value.

Cookies can be temporary, meaning the browser 112 deletes the cookies after the user 110 ends a browsing session by existing the browser 112, or after a specified expiration date or duration. Cookies can also be persistent, meaning that the cookie remains stored with the browser 112 after the user exits the browser 112 or even after the user turns off their device 110, and thus is available to the browser at later times during other web browsing sessions. Cookies may be first party or third party with respect to the server providing the web page currently being displayed by the browser 112. The server currently providing the web page is the first party, and their cookie is a first party cookie. Any other server referenced by the web page is a third party, and their cookie is a third party cookie. Some new versions of web browsers, notably Firefox™, are planning to or have already implemented restrictions that prevent third parties writing to their own cookies when they are serving content in the third party context. Other browsers, referred to as protected browsers, prohibit cookies entirely.

Web page servers 150 (or web servers) store and communicate web pages to users 110 responsive to user requests. In FIG. 1, they are referred to as "external" to distinguish them as being communicatively and physically distinct from the advertiser's web page server 140. Web pages 151 are located at particular internet addresses (e.g., at a particular uniform resource locator (URL)), and generally include informational content such as audio media, video media, and/or interactive computer code. Modern web pages often dynamically respond to user interaction, such that the interaction between the web server 150 and the user 110 is a back and forth process. Many web pages 151 also include ad space for the inclusion of ad instances (or impressions) that will be provided to users 110 viewing the web page. The web server's 150 owner sells the ad space 124A to advertisers 140 as a source of revenue. Advertisers 140 themselves often have their own web pages 141. Advertisers use ad instances on other web pages 141 (such as those provided by web server 150) in order to help drive user traffic to their own web pages. Many advertisers 140 use their web pages 141 to promote and/or sell goods or services to users 110. In some instances, if the web page 151 contains ad content, the provided web page will include computer code indicating where the user 110 can obtain the ad content. This may be simply a web address, or a more sophisticated algorithm.

Mobile application data servers 116 store and communicate mobile application data to users 110. Mobile application 111 data may be retrieved from the mobile application data server 116, as the user interacts with an application 111. Many mobile applications 111 also include ad space 124B for the inclusion of ad instances that will be provided to users 110 interacting with the application 111. Similarly to web pages, the mobile application data server's 116 owner sells the ad space 124B to advertisers 140 as a source of revenue.

Advertisers 140 create ad content to be placed in ad spaces on web pages and/or in mobile applications. To obtain ad space 124, advertisers 140 often partner with ad servers 130. Ad servers 130 work on behalf of advertisers 140 to purchase ad space 124 on behalf of advertisers 140. Generally, ad servers 130 try to purchase ad space 124 that is valuable to advertisers 140. There are many different strategies for determining what an advertiser 140 considers valuable, and so often the ad server 130 will work with the advertiser 140 to determine an advertising campaign strategy dictating which ad space 124 the ad server 130 will buy. While the ad server 130 is depicted as a single entity in FIG. 1 for the sake of discussion, the ad server 130 may represent an ad-delivering system that may be implemented using a variety of architectures and configurations having multiple components, modules, and/or servers in communication. For example, the ad-delivering system may include advertisers, ad-delivering servers, demand side platforms (DSPs), ad networks (horizontal and vertical), ad exchanges, analytic platforms, data management platforms, data aggregators, targeted and behavioral advertising platforms, and/or campaign management systems.

In order to assist the advertiser 140 in purchasing ad space 124, the ad server 130 is configured to log users' web traffic 131 to various web pages and applications and store it in a user data store (UDS) 132. The logged web traffic 131 provides the ad server 130 with information regarding the activities, interests, habits, and purchasing decisions of users 110. As introduced above, cookies and computer code associated with ad instances or web pages provide ways for a server to log web page traffic 131. However, as introduced above some protected browsers eliminate cookies entirely or limit third party cookie activity. Furthermore, at present mobile applications do not make use of cookies.

To address these limitations, a third party company (also referred to as an ad server 130) provides trusted partners with computer code that a partnered advertiser will include in its web pages 141. When the advertiser is the first party, that is when the user is visiting the advertiser's web page, the code interacts with the advertiser's first party cookies 114, and thus has access to functions of the browser 112 reserved to first parties, rather than only those functions accessible to third parties.

When a user interacts with an advertiser's ad instance displayed in a protected browser (e.g., Safari) 124A, or in a mobile application 124B, the application may launch a web page 141 associated with the advertiser, such as the advertiser's web page 141 via another unprotected browser that allows cookies such as browser 112. In doing so the application displaying the ad instance transfers ad instance information 119 to the computer code on the advertiser's web page as part of a uniform resource locater (URL). The URL also contains a web address to a landing page associated with the advertiser's website. The computer code on the landing web page stores the ad instance information 119 in a first party cookie 114. Once the user navigates through intermediate web pages and decides to purchase the product on a purchasing page, the computer program code on the purchasing page retrieves the ad instance information 119 from the first party cookie and sends the information to the ad server 130 along with purchase related information. Additional information such as a timestamp, the user ID, the type and version of the browser 112 (e.g., Chrome™, Firefox™, Internet Explorer™), and an internet protocol (IP) address of the user's computing device operating the browser 112 may also be sent to the ad server 130.

This web page code works around first party/third party browser limitations and the inability to monitor ads displayed to the user in a mobile application without compromising the user's privacy and security. If the user chooses to disable first party cookies, or otherwise chooses to opt out of web traffic logging, then the code abides those preferences and no information will be logged. Further, because the code is only provided to advertisers (or other web pages) who have explicitly formed a real world partnership with the ad server, the code will only be present on web pages that trust the ad server. Thus, the code in effect represents an acknowledgement of trust between the advertiser and ad server to the web browser, implicitly differentiating the ad server as a trustful third party from other third parties who may have maliciously inserted code into an advertiser's web page without the advertiser's permission.

While FIG. 1 describes the advertiser's web server 140 as providing the user with web pages associated with the advertiser's web site and the ad server 130 as logging web traffic associated with the user's interactions with one or more ad instances, any suitable combination of the ad server 130 and the advertiser's website 140 may be used to log web traffic and provide the user with one or more web pages associated with the advertiser's web site. Thus, the ad server 130 may provide the user with web pages associated with an ad instance as well as log web traffic associated with the user's interaction with the ad instance and the web pages, or the advertiser's sever 140 may provide the user with web pages associated with an ad instance as well as log web traffic associated with the web pages and the ad instance.

Implementation Overview

Figure 2A:
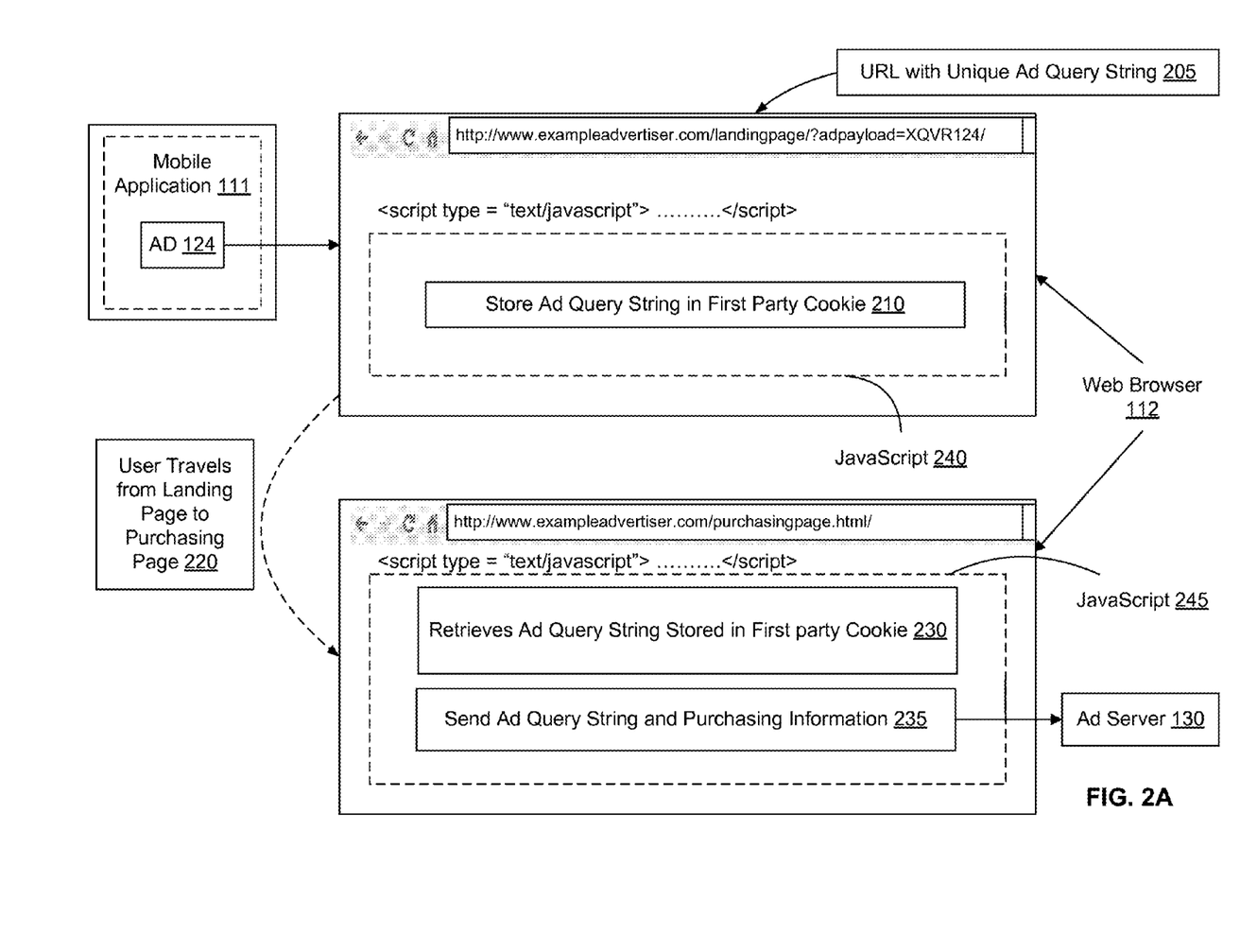
FIG. 2A illustrates logging a user's interaction with an ad instance in a mobile application through to purchase of a product, according to one embodiment.

FIG. 2A illustrates logging a user's interaction with an ad instance in a mobile application through to purchase of a product, according to one embodiment. An ad instance 124 is displayed to the user as the user interacts with a mobile application 111. If the user is interested in the contents of the ad instance, the user may interact with the ad instance 124 by clicking on it. Responsive to the user clicking on the ad instance, a URL 205 containing a web address to a landing page as well as a unique ad query string is sent to the user's web browser.

In one example, the URL 205 may include the string "http://www.exampleadvertiser.com/landingpage/?adquery=XQVR124/". Here, the unique ad instance information associated with the ad instance interacted with by the user is represented by the string "?adquery=XQVR124". The landing page may be the advertiser's generic landing page, or alternatively the landing page in the URL may be a specific web page associated with a particular ad instance or ad campaign. For example, the advertiser may wish to advertise two items, designer watches and dog food, both of which are sold by the advertiser. If the user interacts with an ad instance for designer watches the landing page associated with the ad instance may be the advertiser's web page containing content items related to the designer watches the advertiser has for sale. However, if the user interacts with the dog food ad instance, the landing page associated with the dog food ad instance may be the advertiser's web page containing content items related to the dog food the advertiser has for sale.

The ad query string includes ad instance information uniquely identifying the ad instance (e.g., an ad instance identifier), as well as other characterizing information about the ad such as campaign information, a timestamp, a device id identifying the user device 110, a user id identifying the user, an IP address, an app id identifying the application the user is interacting with, and/or information associated with the operating system (OS) on the user device 110. In one embodiment, the ad instance information is a hashed set of characters, such as "XQVR124". The campaign information may associate the ad instance with an ad campaign including one or more ad instances aimed at promoting a product or a line of products.

The user's web browser 112 loads the landing page. In one embodiment, the landing page contains JavaScript computer code 240 configured to retrieve the ad query string from the URL 205 and store it in a first party cookie 210 associated with the advertiser 140 responsible for the landing page. The user may then navigate to various web pages based on the content displayed to the user on the landing page. The user may then choose to purchase a product, and would thus travel 220 from the landing page to the purchasing page. As the user travels to one or more intermediate web pages the URL's associated with the intermediate web pages do not have to carry the query string associated with the ad instance information.

The purchasing page contains JavaScript computer code 245 configured to retrieve 230 the ad query string stored in the first party cookie. When the user decides to purchase the product on the purchasing page, the JavaScript code sends 235 the ad query string and purchasing information to the ad server 130.

Figure 2B:
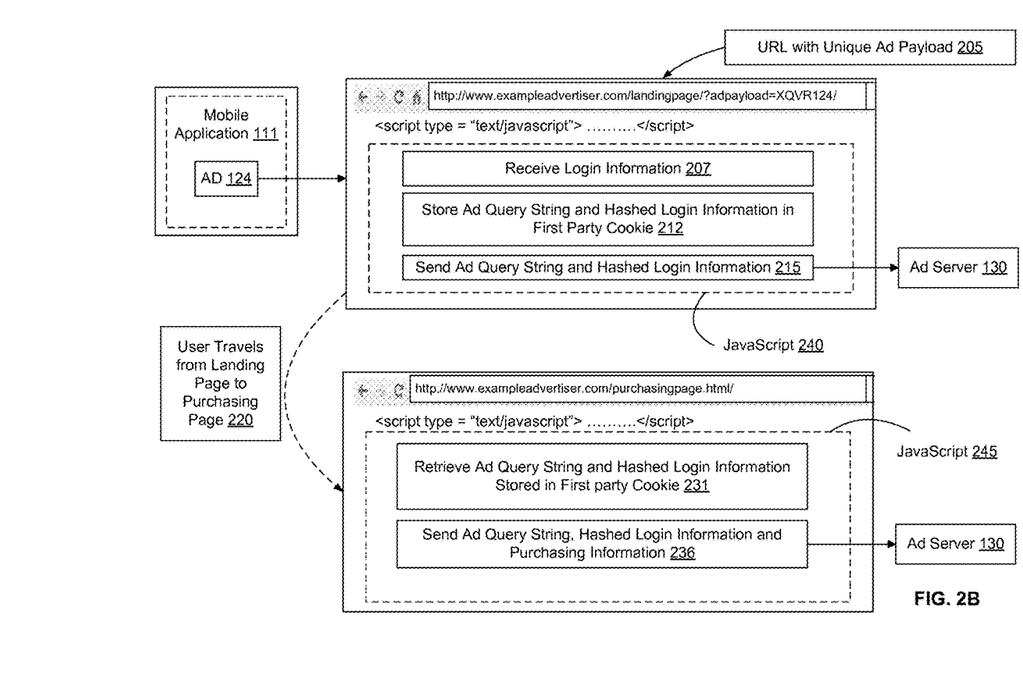
FIG. 2B illustrates logging a user's interaction with an ad instance in a mobile application through to purchase of a product, according to another embodiment.

FIG. 2B illustrates logging a user's interaction with an ad instance in a mobile application through to purchase of a product, according to another embodiment. In this example, using user login information provided to the advertiser, the system is able to identify what ad instance led the user to the landing page, as well as what the user purchased as a result of viewing the ad instance, independent of the device or platform used by the user and the browsing session in which the user interacted with the ad instance and/or the purchasing page. Similar to FIG. 2A, an ad instance 124 is displayed to the user as the user interacts with a mobile application 111. If the user is interested in the contents of the ad instance, the user may interact with the ad instance 124 by clicking on it. Responsive to the user clicking on the ad instance, a URL 205 containing a web address to a landing page as well as a unique ad query string is sent to the user's web browser 112.

In this example, the user is prompted to enter their login information associated with the landing page or the advertiser's website. The JavaScript computer code 240, receives 207 the login information from the user and hashes it to protect it. By hashing the login information the JavaScript computer code 240 converts the login information into a relatively short piece of data such as a string or integer. For example, a user's login information may include a user id: A334, and a user password: dinosaur332. A hash generated for the user's login information may be represented by the string "6586bcgh445". The hashed login information identifies the user, without requiring the JavaScript computer code 240 to store the user's login information and password, thereby maintaining the user's privacy and security.

As above, the JavaScript 240 computer code retrieves the ad query string from the URL 205 and stores 212 the ad query string and the hashed login information in a first party cookie. The JavaScript 240 computer code, sends 215 the hashed login information along with the ad query string to the ad server 130. Again the user then navigates 220 from the landing page to the purchasing page. In one example, the user may end their browsing session on one device and continue at a later time on another user device. For example, the user may interact with the ad instance 124 and the landing page via a web browser 112 on the user's smartphone, but then choose to purchase the product from the purchasing page via a web browser on their laptop at a later time. When the user arrives at the advertiser's website the user is again asked to provide their login information. The JavaScript computer code 240 may then generate the hashed login information using a hash function. Assuming the hashed login information matches hashed login information previously stored in the first party cookie, it is known that the same user is now navigating in a new browsing session. In the event the hashed login information does not match the hashed login information previously stored in the first party cookie the JavaScript computer code 240 either overwrites the previously stored hashed login with the new hashed login or may append the new hashed login to the previously stored hashed login.

As the user navigates to the purchasing page, the JavaScript computer code on the purchasing page 245 retrieves the login information from the purchasing page and generates a hashed login information. Based on the hashed login information the JavaScript computer code 245 identifies a first party cookie associated with the hashed login. The JavaScript computer code on the purchasing page 245 retrieves 231 the ad query string and the hashed login information stored in the first party cookie. When the user decides to purchase the product, the JavaScript computer code 245 receives an indication from the purchasing page, such as a 'flag', prompting the JavaScript computer code 245 to send 236 the hashed login information, ad query string and/or purchasing information to the ad server 130.

Figure 3:
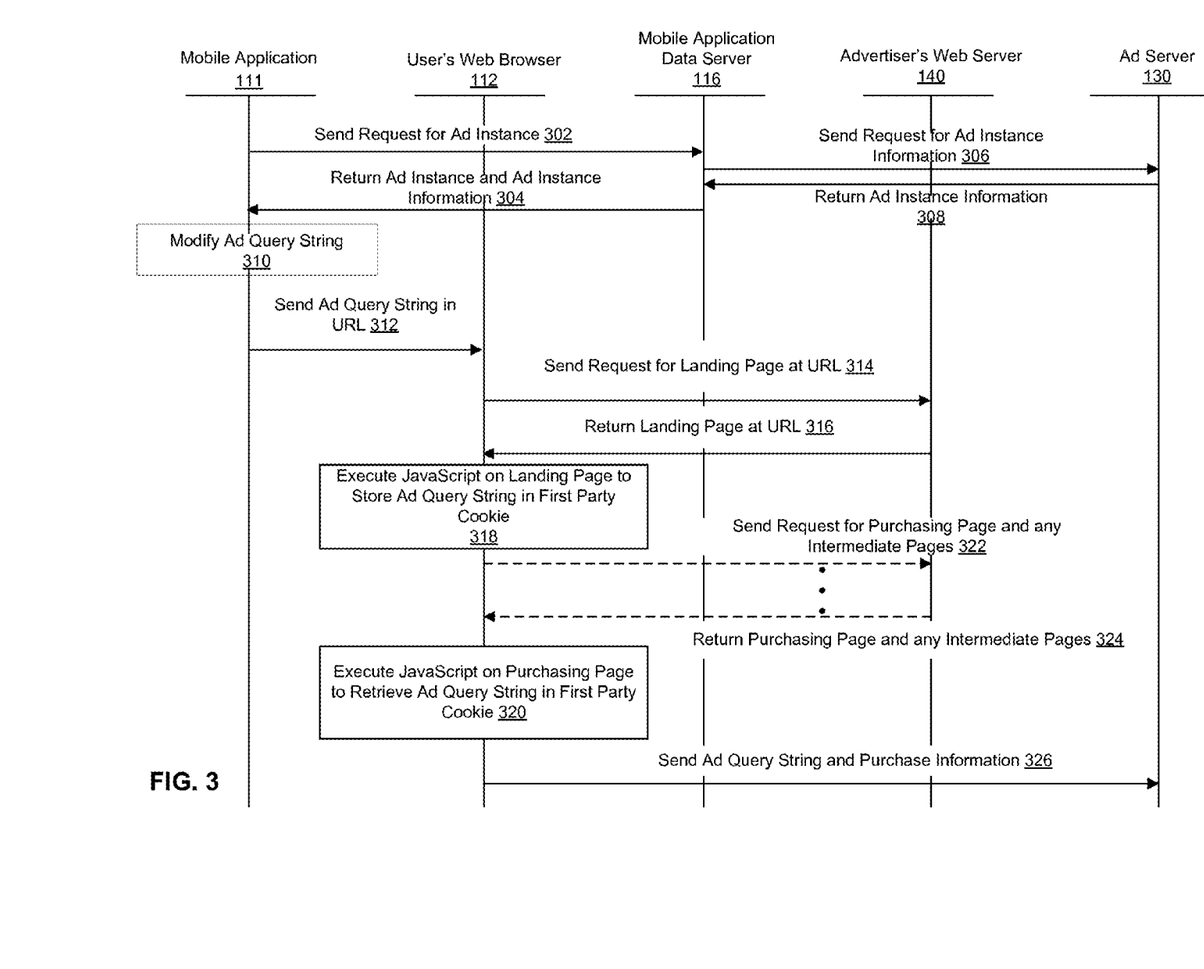
FIG. 3 illustrates an interaction diagram for logging a user's interactions with an ad instance in a mobile application and an advertiser's web page, according to one embodiment.

Tracking Purchases Associated with Ad Instances Displayed to a User via a Mobile Application I. Mobile Application Sends Ad Query String to the Web Browser FIG. 3 illustrates an interaction diagram for logging a user's interactions with an ad instance in a mobile application and an advertiser's web page, according to one embodiment. The embodiments, describe a method for monitoring the interactions of a user with an ad instance, right from when the ad instance is displayed to the user as the user interacts with the mobile application 111 till the user purchases an item sold by the advertiser from the advertiser's purchasing page. As the user interacts with the mobile application 111, the application 111 sends the mobile application data server 116 a request 302 for an ad instance 124B to display to the user. Responsive to the request 302, the mobile application data server 116 sends the ad server 130 a request for an ad query string 306 associated with the ad instance 124B.

Responsive to request 306, the ad server 130 returns 308 the ad query string to the mobile application data server 116, which further returns the ad instance and the ad query string associated with the ad instance to the mobile application 111. Upon receiving the ad instance, the mobile application 111 displays the ad instance to the user. Responsive to the user interaction with the ad instance (e.g., via touch interaction or mouse click), the ad query string is modified 310 to further include information such as the time of the interaction, the number of times the user clicked on the ad instance, and/or whether the click is associated with a specific content region of the ad instance. The ad query string may also be modified to include information associated with the user . For example, a user id used by the user for a particular mobile application and computer 110 information (e.g., a device type, a smart phone's current geographical location) may be added to the ad query string.

Further responsive to user input, the mobile application 111 sends 312 the ad query string in a URL to the user's web browser 112. The URL contains a web address associated with a landing page of the advertiser's website. Responsive to receiving the URL from the mobile application 111, the web browser 112 sends a request 314 for the content of the landing page associated with the URL to the advertiser's web server 140. In response the advertiser's web server 140 returns 316 the landing page associated with the URL to the user's web browser 112. In one example, the landing page is associated with an item sold by the seller exampleseller.com. On arriving at the landing page, the user may be prompted to enter their login information associated with their exampleseller.com account to receive a better customer experience.

II. Store and Retrieving Ad Instance Information in First Party Cookies

The landing page contains computer program code for storing the ad query string in a first party cookie associated with the advertiser's web page. Again, the ad server 130 is configured to provide trusted partner advertisers 140 with web page computer code that the advertiser will include in its web pages. This is a voluntary agreement made by both parties. The computer program code contained in the landing page may be written in JavaScript, or another language, and configured to execute on the landing page. The code retrieves the ad query string from the URL and stores 318 the ad query string in a first party cookie associated with the advertiser's web page and server.

Once on the landing page, the user generally will interact with one or more links or hyperlinks on the landing page that lead the user to zero or more intermediate web pages. In some instances, the user will eventually navigate to a purchasing page associated with an item they want to purchase. For example, responsive to user input, the web browser 112 requests 322 and retrieves 324 the content for one or more intermediate web pages and the purchasing page.

The purchasing page contains computer program code, different from that on the landing page, for retrieving the ad query string stored in the first party cookie 320. Again, this is per a previous agreement between the ad server 130 and an advertiser 140. The computer code retrieves 320 the ad query string from the first party cookie in response to the user purchasing a product via the purchasing page. The computer code sends 326 the retrieved ad query string and purchase related information to the ad server 130 in a payload. This payload may be referred to as a conversion payload, where the conversion in this instance is the purchase. Purchase information may include, for example, product information, price information, ad campaign information associated with the product, etc.

While FIG. 3 describes the computer code on the purchasing page retrieving the ad instance information from the first party cookie and sending the ad instance information to the ad server, computer code configured to perform similar functionality may be present in one or more intermediate pages. Hence, in various embodiments, intermediate pages or the purchasing page can retrieve the ad instance information from a first party cookie, and send the ad instance information to the ad server 130. Additionally, while the example of FIG. 3 describes a purchase, the process is equally applicable to any other kind of conversion, including the completion of a survey, signing up for a service, and other examples where the user converts by completing an activity specified by the advertiser.

Figure 4:
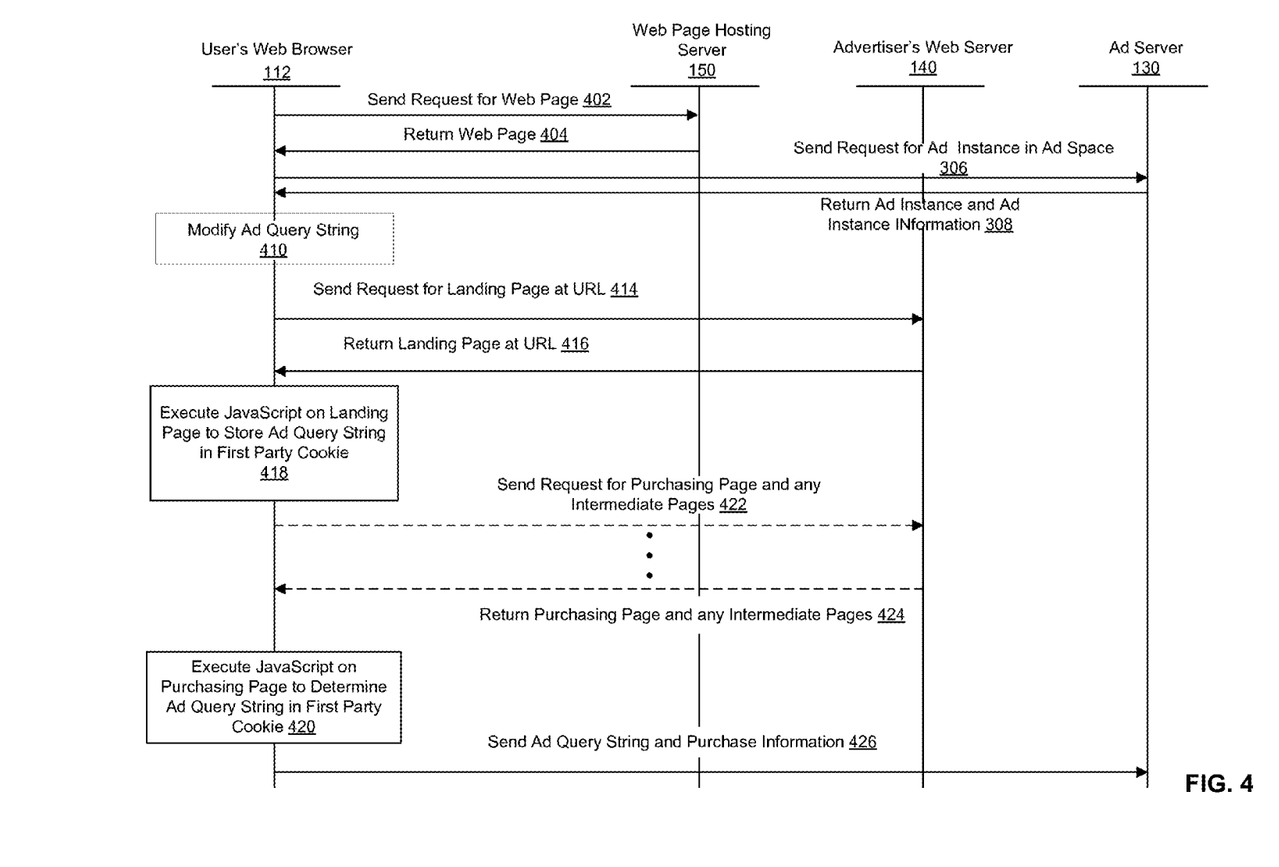
FIG. 4 illustrates an interaction diagram for logging a user's interactions with an ad instance via a protected web browser and an advertiser's web page, according to one embodiment.

Tracking Purchases Associated with Ad Instances Displayed to a User via a Protected Web Browser I. Unprotected Web Browser Retrieves Ad Instance Information FIG. 4 illustrates an interaction diagram for logging a user's interactions with an ad instance via a protected web browser and an advertiser's web page, according to one embodiment. The diagram describes a method for monitoring the interactions of a user with an ad instance, right from when the ad instance is displayed to the user via a web page different from the advertiser's web page till the user purchases an item sold by the advertiser from the advertiser's purchasing page. As the user interacts with the web browser 112, the web browser 112, sends the web page hosting server 150 a request 402 for a web page to display to the user. Responsive to the request 402, the web page hosting server 150 returns a web page to the user's web browser 112 to display to the user. To fill the ad spaces in the web page the web browser 112 sends the ad server 130 a request 406 for an ad instance for the ad space. Responsive to request 406 the ad server 130 returns 408 an ad instance 124A and an ad query string associated with the ad instance to the user's web browser 112.

On receiving the ad instance the web browser 112 displays the ad instance to the user, as a standalone ad or as part of a web page. Similar to FIG. 3, responsive to the user clicking on the ad instance, the ad query string is modified 410 to include additional information.

Responsive to the user clicking on the ad instance, the same, unprotected web browser (shown) 112 or a second, unprotected web browser (where the first web browser was, in contrast, protected) (not shown) receives a URL containing a web address to a landing page associated with the advertiser's web page and the ad query string. If the same web browser is used prior to and after the ad interaction, the process is as shown. In the case where prior to ad interaction a protected browser was used, interaction with the ad may trigger the launching of the second, unprotected browser 112. The user's web browser 112 then sends 414 a request for a landing page associated with the URL. In response the advertiser's web server 140 returns 416 the landing page associated with the URL to the user's web browser 112 to display to the user.

II. Store and Retrieve Ad Instance Information via a First Party Cookie

The landing page contains computer code 240 for retrieving the ad query string from the URL and storing 418 the ad query string in a first party cookie associated with the advertiser's web page.

As discussed above the user may navigate to multiple intermediate pages prior to arriving at a purchase page. During this process the user's web browser sends 422 a request for a purchasing page and any intermediate pages to the advertiser's web server 140. Responsive to the request 422, the advertiser's web browser returns 424 a purchasing page or any intermediate pages to the user's web browser 140 to display to the user. The computer code on the purchasing page retrieves 420 the ad query string stored in the first party cookie. The computer code then sends 426 the retrieved ad query string and purchase information to the ad server 130.

Implementation across Multiple Browser Sessions

Figure 7:
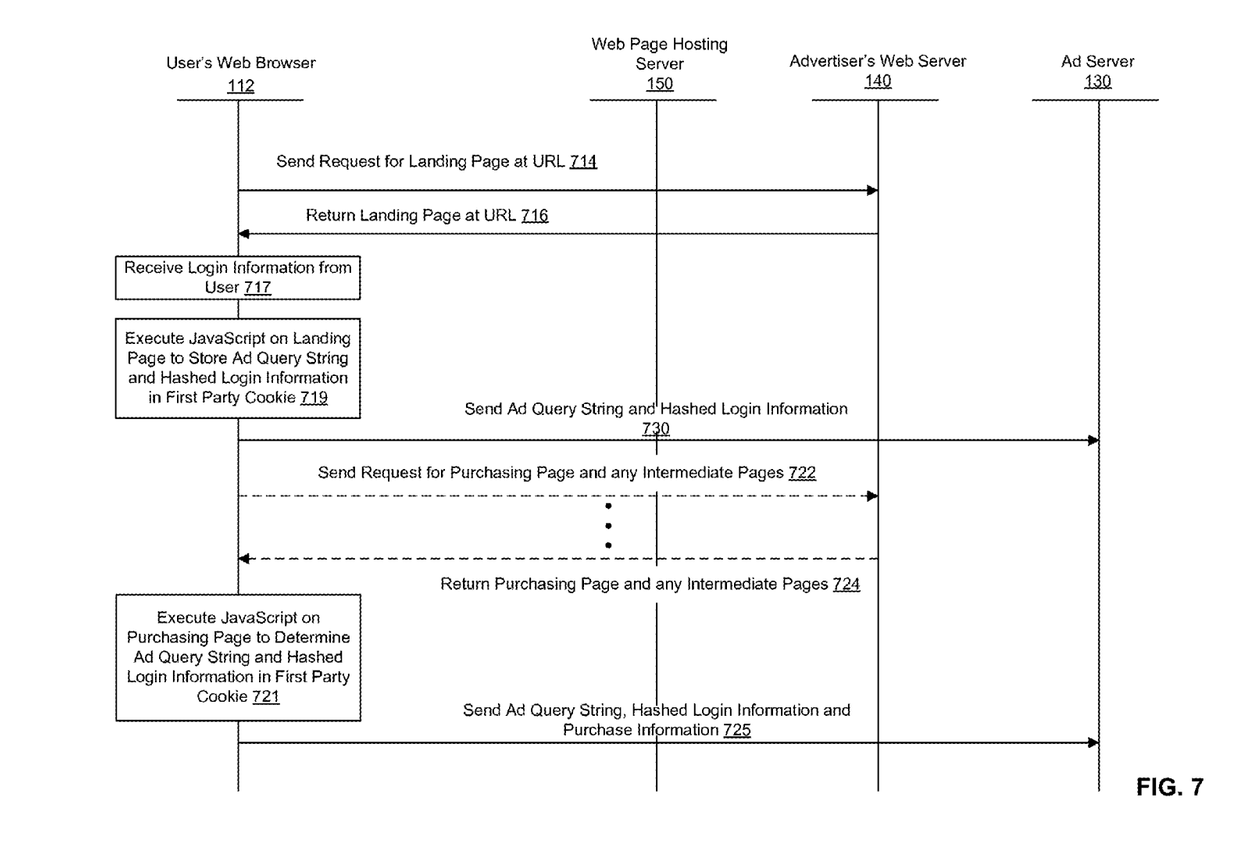
FIG. 7 is an interaction diagram for logging a user's interactions with an ad instance displayed to the user via a protected web browser and an advertiser's web page where the user logs in to the advertiser's web page, according to one embodiment.

FIG. 7 is an interaction diagram for logging a user's interactions with an ad instance displayed to the user via a protected web browser and an advertiser's web page where the user logs in to the advertiser's web page, according to one embodiment. Similar to FIG. 4, the user's web browser receives the ad query string in a URL. Responsive to the URL received from the ad instance the user interacts with, the web browser 112 sends 714 a request for the landing page associated with the URL to the advertiser's web server 140. In response the advertiser's web server 140 returns 716 the landing page associated with the URL to the user's web browser 112 to display to the user.

On some landing pages, the user is asked to enter login credentials. The web browser 112 receives 717 the login information from the user. The computer code contained in the landing page either hashes the login information provided by the user, or receives hashed login information from the advertiser 140, for example responsive to a successful login. The computer code also retrieves the ad query string from URL. The computer code then stores 719 the hashed login information and the ad query string in a first party cookie. The computer code may also send 730 the ad query string and the hashed login information to the ad server 130 as part of an initial report on the user's web traffic.

As above the user may eventually navigate to a purchase page. The computer code on the purchasing page retrieves 721 the ad query string and the hashed login information stored in the first party cookie. The computer code sends 725 the retrieved ad query string, the hashed login information, and purchase information to the ad server 130.

Example Process for Code on the Advertiser's Web Page

Figure 5:
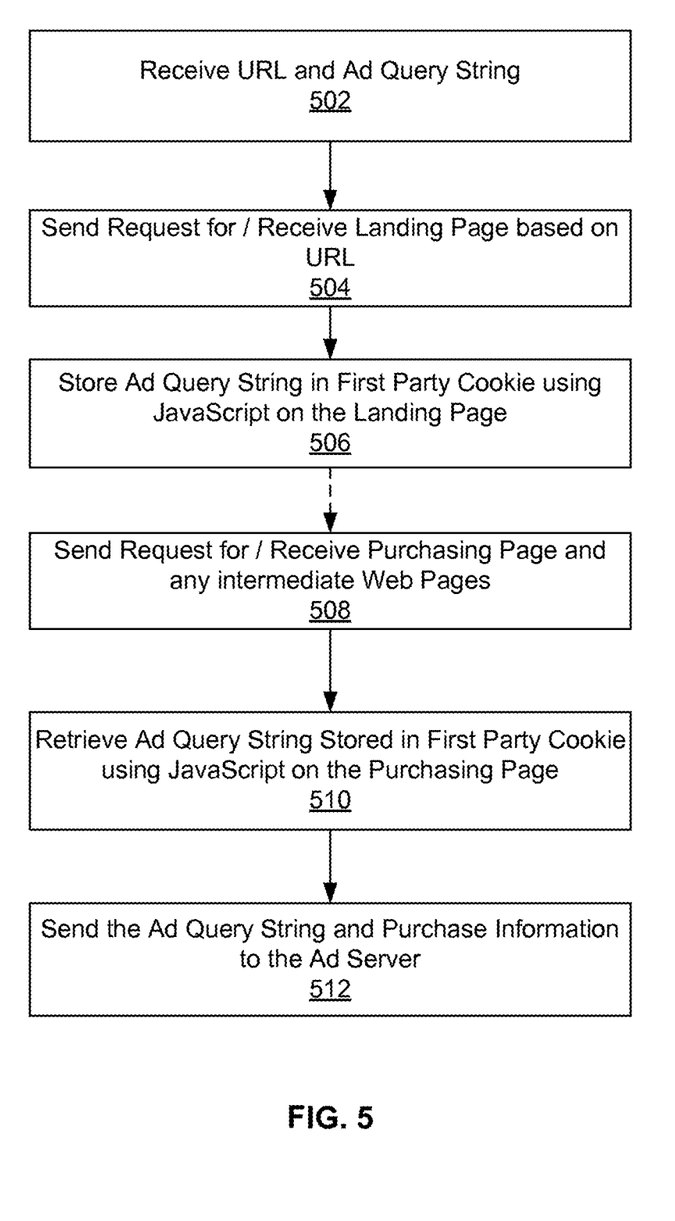
FIG. 5 is a flowchart illustrating an example process for using an advertiser's first party cookie to store, access, and report ad instance information to an ad server, according to one embodiment.

FIG. 5 is a flowchart illustrating an example process for using an advertiser's first party cookie to store, access, and report ad instance information to an ad server, according to one embodiment. The user's web browser 112 receives 502 a URL containing the ad query string and a web address identifying a landing page associated with an advertiser partnered with an ad server. The ad query string contains ad instance information regarding an ad instance the user interacted with. Based on the URL, the web browser sends 504 a request to the advertiser's web server 140 requesting web page content for a landing page identified by the web address. The web browser displays the received landing page to the user.

The landing page contains computer code for retrieving the ad query string stored in the URL and storing 506 the ad query string in a first party cookie. During this process, the web browser sends 508 requests for the intermediate web pages to the advertiser's web server 140, and receives 508 in response the intermediate web pages to display to the user. After navigating through various intermediate pages the user may then choose to purchase a product. The user's web browser may then send 508 a request to the advertiser's web server 140, requesting the purchasing page. Once the web browser 112 receives 508 the purchasing page from the advertiser, the web browser displays the purchasing page to the user. The purchasing page may contain a computer code configured to retrieve 510 from the first party cookie the ad query string and any other information associated with the ad query string.

Responsive to the user purchasing the product on the purchasing page the computer code may send 512 (via the web browser) the retrieved ad query string and web page information retrieved from the first party cookie, as well as purchasing information associated with the product purchased, to the ad server 130. Thus, the system is able to log which ad instance the user interacted with, when the user interacted with the ad instance, what landing page and intermediate web pages the user visited, and what the user purchased based on the ad instance information stored in the ad query string and other information stored in the first party cookie.

Example Code on the Advertiser's Web Page Including Multiple Browsing Session

Figure 6:
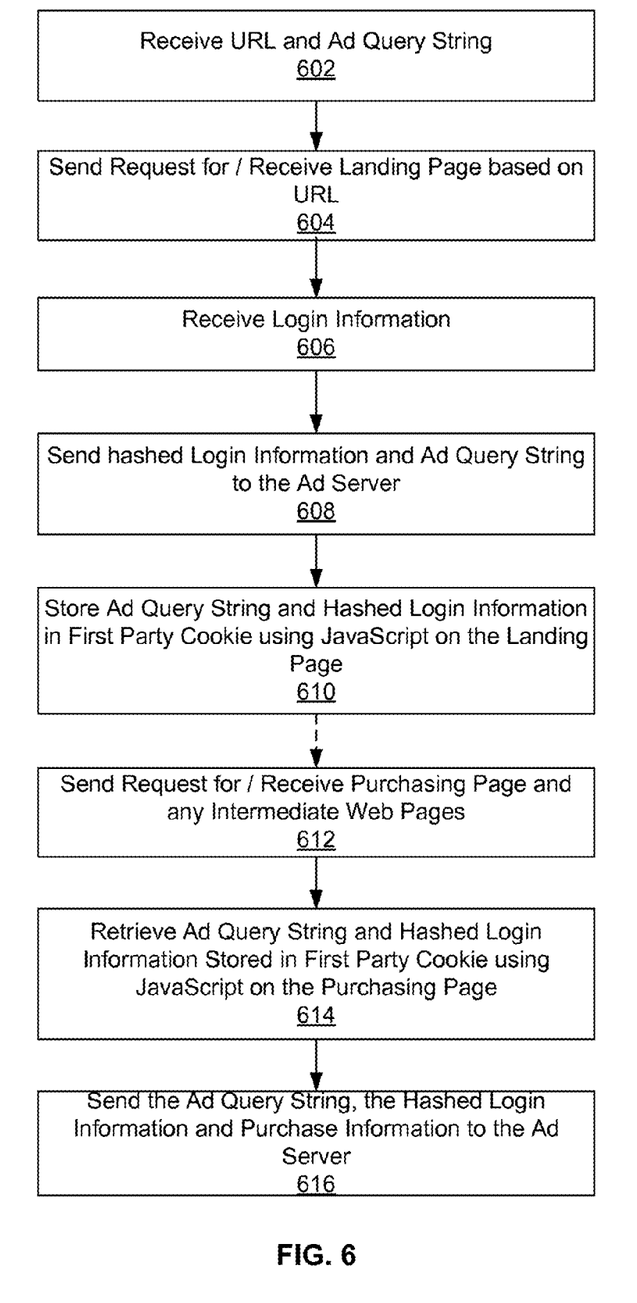
FIG. 6 is a flowchart illustrating another example process using an advertiser's first party cookie to store, access, and report ad instance information to an ad server where the user can log in to the advertiser's web page, according to one embodiment.

FIG. 6 is a flowchart illustrating another example process using an advertiser's first party cookie to store, access, and report ad instance information to an ad server where the user can log in to the advertiser's web page, according to one embodiment. Similar to FIG. 5 the user's web browser 112 receives a URL containing the ad query string 602. The URL contains a web address identifying a landing page as well as the ad query string. Based on the URL, the web browser sends a request 604 to the advertiser's web server 140 requesting a landing page identified by the web address. On receiving the landing page 604, the web browser displays the landing page to the user.

In one embodiment, on displaying the landing page to the user, the user is prompted to enter their login information associated with an advertiser's web site. Computer program code 240 on the landing page receives 606 the login information from the user, and generates a hashed version of the login information. The computer code 240 on the landing page retrieves the ad query string stored in the URL and sends 608 the hashed login information of the user and the ad query string to the ad server 130. The computer code 240 also stores 610 the hashed login information as well as the ad query string in a first party cookie.

Similar to FIG. 5, as the user navigates through intermediate pages the web browser sends 612 requests for the intermediate web pages to the advertiser's web server 140, and receives 612 in response the intermediate web pages to display to the user. The user may end the browsing session on one user device, such as their smartphone, and after a period of time return to the advertiser's website during a subsequent browser session on a different user device. Again the user may be prompted to enter their login information, which is converted to the same hashed login information. The hashed login information may then be stored in a first party cookie. Thus, the system is able to track the user's activity with respect to the advertiser's web site without compromising the user's privacy or security.

After navigating through various intermediate pages the user may then choose to purchase a product. The user's web browser may then send 612 a request to the advertiser's web server 140, requesting the purchasing page to display to the user. The purchasing page may contain computer code 245 configured to retrieve 614 from the first party cookie the ad query string, the hashed login information and any other information associated with the ad query string. Responsive to the user purchasing the product on the purchasing page the computer code sends 616 the retrieved ad query string, hashed login information and web page information as well as purchasing information associated with the product purchased, to the ad server 130. The system is able to track which ad instance the user interacted with, when the user interacted with the ad instance, what landing page and intermediate web pages the user visited, and what the user purchased based on the ad instance information stored in the ad query string and other information stored in the first party cookie, independent of the user's browsing session.

Additional Considerations

Various embodiments may be implemented in the form of computer code for use with a computer system. The code includes instructions for operating computer systems, and can be stored on a variety of persistent computer-readable storage media. Illustrative persistent computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

The invention claimed is:
1. A method comprising:
retrieving a first web page from a seller's server using a uniform resource locater (URL);
executing computer code included as part of the first web page, the computer code configured to:
receive login information from a user, generate a user identifier corresponding to the user based upon the received login information, access, using a first party cookie associated with the seller's server, a previously generated user identifier and an advertisement (ad) query string associated with a previous browsing session, the ad query string generated by an ad server different from the seller's server and associated with an interaction with an ad instance during the previous browsing session;

associate the user with the previous browsing session based upon a determination that the user identifier and the previously generated user identifier are the same;

retrieving a second web page from the seller's server;

identifying a transaction on the second web page;

executing computer code included as part of the second web page, the computer code configured to:

generate, based upon the first party cookie, a conversion payload based on the ad query string, the user identifier, and an indication of the transaction, and send the conversion payload to the ad server.

2. The method of claim 1, wherein the interaction with the ad instance comprises receiving a URL from an application including the ad query string, the application displaying the ad instance and the application separate from the web browser.

3. The method of claim 1, wherein the interaction with the ad instance is associated with a third party web page not retrieved from the seller's server, the third party web page displaying the ad instance.

4. The method of claim 1, wherein the ad instance is uniquely associated with the ad query string.

5. The method of claim 1, wherein the first web page is different from the second web page.

6. The method of claim 1, wherein the first web page comprises one or more hyperlinks, the hyperlinks coupling directly or indirectly to the second web page through one or more intermediate web pages.

7. The method of claim 1, wherein the ad query string encodes at least one from the group consisting of: a timestamp, a device identifier, an interaction information and a campaign identifier.

8. The method of claim 1, wherein the user identifier comprises a hash of the login information.

9. The method of claim 8, wherein the login information comprises at least a username and a password associated with the user.

10. The method of claim 1, wherein the computer code included as part of the first web page is further configured to send, based on the comparison, the user identifier and the ad query string to the ad server.

11. A computer readable medium comprising:

instructions configured to be included as part of a first web page provided by a seller's server, the instructions, when executed by a processor, causing a processor to perform the steps of:

receive login information from a user, generate a user identifier corresponding to the user based upon the received login information, access, using a first party cookie associated with the seller's server, a previously generated user identifier and an advertisement (ad) query string associated with a previous browsing session, the ad query string generated by an ad server different from the seller's server and associated with an interaction with an ad instance during the previous browsing session;

associate the user with the previous browsing session based upon a determination that the user identifier and the previously generated user identifier are the same;

instructions configured to be included as part of a second web page provided by the seller's server, the instructions, when executed by a processor, causing a processor to perform the steps of:

identify a transaction on the second web page, generate, based upon the first party cookie, a conversion payload based on the ad query string, the user identifier, and an indication of the transaction, and send the conversion payload to the ad server.

12. The computer readable medium of claim 11, wherein the interaction with the ad instance comprises receiving a URL from an application including the ad query string, the application displaying the ad instance and the application separate from the web browser.

13. The computer readable medium of claim 11, wherein the interaction with the ad instance is associated with a third party web page not retrieved from the seller's server, the third party web page displaying the ad instance.

14. The computer readable medium of claim 11, wherein the ad instance is uniquely associated with the ad query string.

15. The computer readable medium of claim 11, wherein the first web page is different from the second web page.

16. The computer readable medium of claim 11, wherein the first web page comprises one or more hyperlinks, the hyperlinks coupling directly or indirectly to the second web page through one or more intermediate web pages.

17. The computer readable medium of claim 11, wherein the ad query string encodes at least one from the group consisting of: a timestamp, a device identifier, an interaction information and a campaign identifier.

18. The computer readable medium of claim 11, wherein the user identifier comprises a hash of the login information.

19. The computer readable medium of claim 18, wherein the login information comprises at least a username and a password associated with the user.

20. The computer readable medium of claim 11, wherein the instructions configured to be included as part of the first web page are further configured to cause the processor to send, based on the comparison, the user identifier and the ad query string to the ad server.

* * * * *

UNITED STATES PATENT AND TRADEMARK OFFICE
CERTIFICATE OF CORRECTION

PATENT NO. : 9,875,485 B2
APPLICATION NO. : 15/633398
DATED : January 23, 2018
INVENTOR(S) : Mark Charles Torrance, Michael Jared Benisch and Rajaraman Periasamy It is certified that error appears in the above-identified patent and that said Letters Patent is hereby corrected as shown below:

On the Title Page

At Line 7 of the Abstract item (57), delete "interaction with the ad a URL" and insert --interaction with the ad, a URL--.

In the Claims

Column 13, Claim 7, Lines 41 and 42, delete "a device identifier, an interaction information and a campaign identifier" and insert --a device identifier, interaction information, and a campaign identifier--.

Column 14, Claim 17, Lines 44 and 45, delete "a device identifier, an interaction information and a campaign identifier" and insert --a device identifier, interaction information, and a campaign identifier--.

Signed and Sealed this
Seventeenth Day of July, 2018

Andrei Iancu
*Director of the United States Patent and Trademark Office*